(12) United States Patent
Bell

(10) Patent No.: US 7,611,320 B2
(45) Date of Patent: Nov. 3, 2009

(54) PORTABLE LOG SKIDDER FOR ALL TERRAIN VEHICLE WITH HOIST MEANS

(76) Inventor: Scott D. Bell, 2833 N. Osceola Rd., Redfield, NY (US) 13437

( * ) Notice: Subject to any disclaimer, the term of this patent is extended or adjusted under 35 U.S.C. 154(b) by 219 days.

(21) Appl. No.: 11/500,777

(22) Filed: Aug. 8, 2006

(65) Prior Publication Data
US 2008/0038103 A1 Feb. 14, 2008

(51) Int. Cl.
*B60P 9/00* (2006.01)
*A01G 23/08* (2006.01)
*B66C 23/44* (2006.01)
*B66D 1/36* (2006.01)

(52) U.S. Cl. .................. 414/462; 414/540; 414/559; 144/4.1; 212/180; 212/233; 254/325

(58) Field of Classification Search .............. 144/336, 144/34.2, 4.1; 212/180, 233; 254/266, 279, 254/323, 324, 325–327; 414/462, 540, 543, 414/559, 569, 703, 734, 735, 920, 406, 410, 414/563, 731, 739; 224/492, 495, 501, 519
See application file for complete search history.

(56) References Cited

U.S. PATENT DOCUMENTS

| | | | |
|---|---|---|---|
| 1,026,901 A | 5/1912 | Brown | |
| 2,470,242 A * | 5/1949 | Felsing | 254/323 |
| 3,362,550 A * | 1/1968 | Kappler | 414/734 |
| 4,067,471 A * | 1/1978 | Roatcap | 414/703 |
| 4,881,864 A | 11/1989 | Amato | |
| 5,010,933 A * | 4/1991 | Doyle | 144/336 |
| 5,393,194 A | 2/1995 | Smith | |
| 5,593,139 A * | 1/1997 | Julian | 254/325 |
| 5,707,072 A * | 1/1998 | Hopper | 280/491.5 |
| 5,788,095 A | 8/1998 | Watson | |
| 5,975,831 A | 11/1999 | Martin | |
| 6,030,170 A * | 2/2000 | Lewis | 414/703 |
| 6,042,328 A | 3/2000 | Mc Vaugh | |
| 6,138,991 A | 10/2000 | Myers, Jr. | |
| 6,231,030 B1 | 5/2001 | Smith | |
| 6,312,210 B1 | 11/2001 | Lang | |
| 6,769,858 B1 | 8/2004 | Butler et al. | |
| 6,821,075 B2 | 11/2004 | van der Horn | |
| 6,932,555 B2 * | 8/2005 | Dale et al. | 414/607 |
| 2002/0048504 A1 * | 4/2002 | Jacobs | 414/541 |

* cited by examiner

Primary Examiner—Gregory W Adams

(57) ABSTRACT

An accessory is mounted on the rear end of an All Terrain Vehicle (ATV) to pull logs and the like out of areas that are not accessible to trucks or other such vehicles. The accessory is a winch that is mounted on the ATV via the hitch attachment of the ATV. A brace extends from the rear end of the ATV to support the winch. A pulley system is attached to the winch whereby a log or the like is attached to the ATV. A counterweight is also mounted on the ATV.

3 Claims, 1 Drawing Sheet

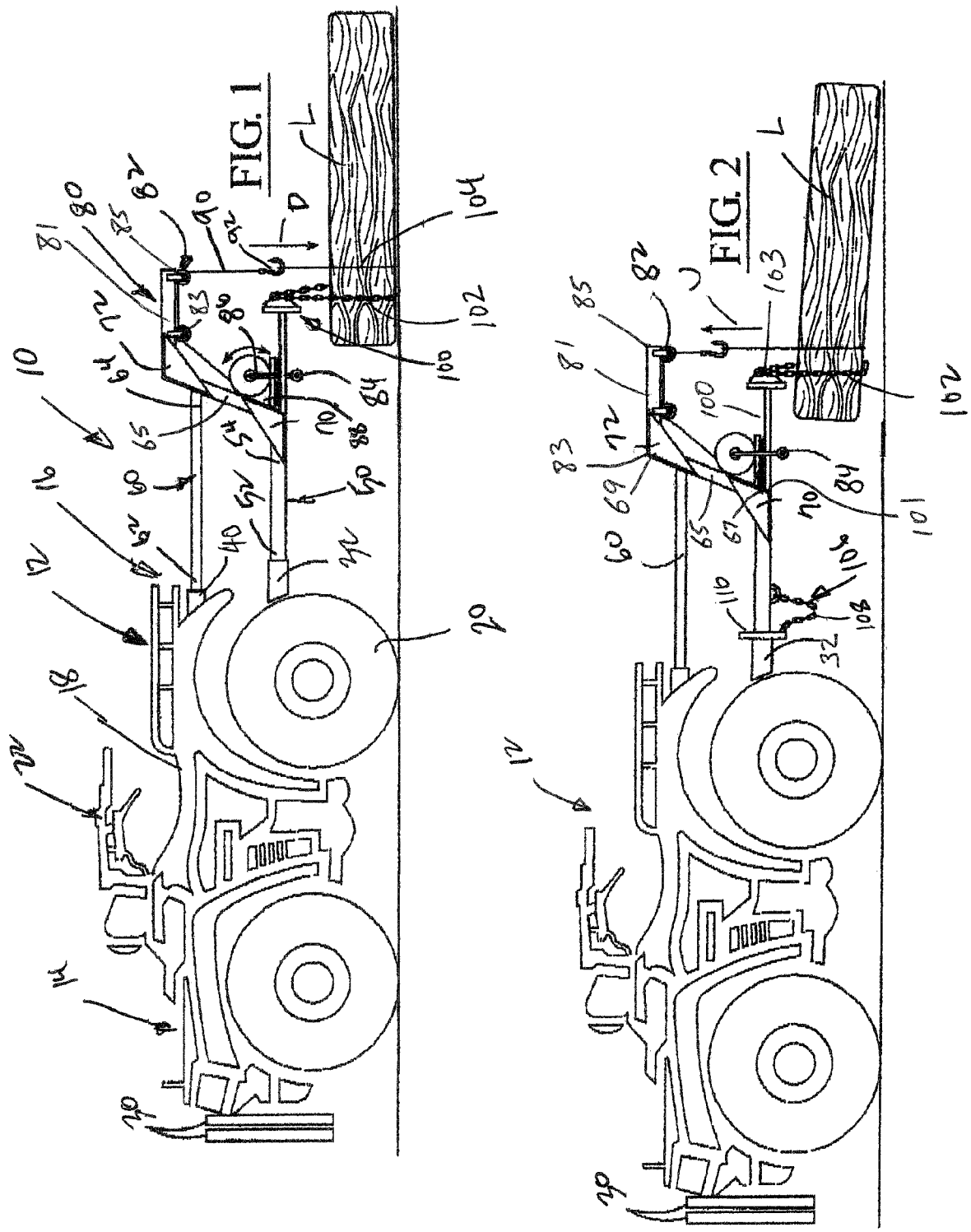

PORTABLE LOG SKIDDER FOR ALL TERRAIN VEHICLE WITH HOIST MEANS

TECHNICAL FIELD OF THE INVENTION

The present invention relates to the general art of All Terrain Vehicles (ATV) and to the particular field of accessories for ATVs.

BACKGROUND OF THE INVENTION

There are many instances where it is highly desirable to lift substantial loads onto a vehicle for transport to another location and then off-load the vehicle. At times, such loads are at remote locations where there may be only a single individual available for lifting the load onto the vehicle or off-loading the vehicle. For example, hunting areas are typically at remote locations and it is oftentimes very difficult to lift game such as deer, hogs, antelopes and the like onto a vehicle by a single hunter or even a pair of hunters for transport to another location. Frequently, all-terrain vehicles are used for this purpose because of their capability to access remote locations. However, even all-terrain vehicles require one or more individuals to lift the game onto a support rack or basket carried by the vehicle and oftentimes this cannot be accomplished by a single or even a pair of hunters.

Another example of such heavy loads is logs from downed trees or the like. In the past, log skidders have been used to remove such items. Log skidders are first considered in two fundamental groups: (a) self powered; and (b) trailed. Conventional self powered type log skidders are generally comprised of a comparatively massive and powerful vehicle typically utilizing a pivoted hoist or boom operated by a hydraulic cylinder. Conventional trailed type log skidders also typically possess a pivoted hoist or boom operated by a hydraulic cylinder. Both self powered and trailed conventional type log skidders further typically use a pivoting rigid grapple to grasp one end of a group of logs and simply drag this load by the grapple after retraction of the boom effecting elevation of the load. And both types of conventional log skidders are further generally characterized by either comprising, or being suited for operation in conjunction with, an off road tractor possessing large driven wheels fitted with tires possessing a protruding tread intended to provide considerable traction in loose soil by digging into and displacing the same which action is considered detrimental to vegetation both directly by uprooting the same and indirectly through the loss of topsoil eroded due to the displacement of the topsoil by the protruding tread of the off road tractor drive wheels which is further exacerbated by the loss of vegetation. It is generally recognized that the degradation of the environment due to the disturbing and loss of topsoil and vegetation during a skidding operation is largely the consequence of utilizing comparatively massive vehicles for economic removal of trees from a harvest site and that the use of protruding tread tires specifically is destructive of the ecosystem dependent upon stationary topsoil.

The loss of topsoil may be of concern to a commercial logging operation but the use of relatively massive vehicles for skidding a dozen trees at a time and requiring tires with protruding tread is considered necessary for economic operation. For a private owner of wooded property, who isn't concerned with the economic benefit of harvesting timber as much as with avoiding disturbance of that property, a much smaller and less intrusive means of skidding just one large tree or several smaller trees at once is considered attractive.

SUMMARY OF THE INVENTION

The above-discussed disadvantages of the prior art are overcome by an accessory that is mounted on the rear end of an All Terrain Vehicle (ATV) to pull logs and the like out of areas that are not accessible to trucks or other such vehicles. The accessory is a winch that is mounted on the ATV via the hitch attachment of the ATV. A brace extends from the rear end of the ATV to support the winch. A pulley system is attached to the winch whereby a log or the like is attached to the ATV. A counterweight is also mounted on the ATV. The counterweight is located on the front end of the ATV.

Using the accessory embodying the present invention will allow a single person to remove heavy logs from difficult-to-reach areas. In this manner, a single person can complete the work that would otherwise require several people. The number of trips required to remove a tree or the like can be reduced as well by the use of the ATV.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 is a side elevational view of an ATV having thereon a log skidder embodying the present invention with the log in a rest position.

FIG. 2 is a side elevational view of an ATV having thereon a log skidder embodying the present invention with the log in a lifted position.

DETAILED DESCRIPTION OF THE INVENTION

Referring to the figures, it can be understood that the present invention is embodied in a log skidder attachment 10 for an All Terrain Vehicle (ATV). Attachment 10 comprises an All Terrain Vehicle 12 having a front end 14 and a rear end 16 as well as a seat 18, wheels 20 and a steering mechanism 22 as is usual to such vehicles. A counterweight 30 is mounted on the front end and an ATV hitch 32 is located on the rear end. A support sleeve 40 is mounted on the rear end spaced apart from the ATV hitch and is located above the hitch when the ATV is in the use position as shown in FIGS. 1 and 2.

A first brace bar 50 has a first end 52 accommodated in the ATV hitch and a second end 54 spaced apart from the rear end. A second brace bar 60 has a first end 62 accommodated in support sleeve 40 and a second end 64 spaced apart from the rear end and spaced apart from and above the second end of the first brace bar. A first brace bracket 70 is mounted on the first brace bar near second end 54 of the first brace bar, and a second brace bracket 72 is mounted on the second brace bar near second end 64 of the second brace bar.

A winch mechanism 80 is mounted on the first and second brace bars via the first and second brace brackets and includes a pulley system 82 that is located spaced apart from and near second end 64 of the second brace bar. The winch mechanism 80 includes a first post 65 having a first end 67 and a second end 69. The first end of the first post 65 is coupled to the second end 54 of the first brace bar 50. The second end 64 of the second brace bar 60 is coupled adjacent to the second end of the first post 65. The winch mechanism 80 also includes a second post 81 having a first end 83 and a second end 85. The second post has a longitudinal axis between the first end 83 and the second end 85. The longitudinal axis of the second post is substantially parallel with the longitudinal axis of the first brace bar. The first end 83 of the second post 81 is coupled to the second end 69 of the first post 65. The second post 81 supports the pulley system 82. The pulley system 82 includes a first pulley 83 and a second pulley 85. The second pulley coupled adjacent to the second end 85 of the second post 81, and the first pulley 83 is located between the rear end and the second pulley 85. A turning mechanism 84 is located near first brace bar 50 and can include a hand crank 86 or an electric motor 88 or both. A cable 90 is connected to the turning mechanism and to the pulley system and a hook element 92 is connected to the cable to be located adjacent to the second ends of the first and second brace bars. The hook element is attached to a log L to attach the log to the All Terrain Vehicle.

A log attachment mechanism 100 having a first end 101 and a second end 103. The log attachment mechanism 100 having a longitudinal axis between the first end 101 and the second end 103. The first end 101 coupled is fixedly mounted on second end 54 of the first brace bar, and the second end 103 of the log attachment mechanism 100 includes a chain 102 which depends from second end 54 of the first brace bar and which is attached to the log to attach the log to the All Terrain Vehicle. The second post 81 supports the pulley system 82 so that the second pulley 85 is farther away from the rear end than the log attachment mechanism 100 along the longitudinal axis of the first brace bar 50.

Use of attachment 10 can be understood from the teaching of FIGS. 1 and 2 and the foregoing disclosure and thus will not be presented in detail. After hook 92 is lowered as indicated by arrow D in FIG. 1, Log L is attached to chain 102 and via a second chain 104 to hook 92. A second lock mechanism 106 can be attached to the first brace bar using a chain 108 and a flange 110 if suitable. The winch mechanism is operated to lift the log as indicated by arrow U in FIG. 2 while counterweight 30 balances the ATV. Once the log is lifted as indicated in FIG. 2, the ATV can be operated to drag the log to a desired location.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A log skidder attachment for an All Terrain Vehicle (ATV), the ATV having a rear end with an ATV hitch, the log skidder attachment comprising:
   A) a first brace bar having a first end coupled to and extending rearward from the ATV hitch and a second end spaced apart from the rear end, the first brace having a horizontal longitudinal axis between the first end and the second end;
   B) a winch mechanism mount including
      (1) a first post having a first end and a second end, the first end of the first post coupled to the second end of the first brace bar, wherein the first post is angled upwardly from the first brace bar,
      (2) a second post having a first end and a second end, the first end of the second post fixedly coupled to and extending rearwardly from the second end of the first post, the second post having a longitudinal axis between the first end and the second end, wherein the longitudinal axis of the second post is parallel to the longitudinal axis of the first brace bar,
      (3) a pulley system having a first pulley and a second pulley, the second post supporting the first pulley and the second pulley, the second pulley coupled adjacent to the second end of the second post, and the first pulley located between the rear end and the second pulley,
      (4) a turning mechanism coupled to the second end of the first brace bar,
      (5) a cable connected to the turning mechanism and to the first pulley and the second pulley, and
      (6) a hook element connected to the cable; and
   C) a log attachment mechanism coupled adjacent to the second end of the first brace bar, the log attachment mechanism including a third post fixedly coupled adjacent the second end of the first brace bar and the first end of the first post, wherein the third post extends rearwardly parallel with the first brace bar and the second post and is located in spaced relationship below the second post, wherein the log attachment mechanism further includes a chain for lifting a log, the second pulley located farther away from the rear end than the log attachment mechanism along the longitudinal axis of the first brace bar, where the first brace bar, the winch mechanism, and the log attachment mechanism are all off the ground when the first end of the first brace bar is attached to the ATV hitch.

2. The log skidder system according to claim 1, including a second brace bar having a first end and a second end, the first end of the second brace bar adapted to couple to the ATM, the second end of the second brace bar coupled to the first post adjacent to the second end of the first post and spaced apart from the rear end and spaced apart from the second end of the first brace bar.

3. The log skidder system according to claim 2, where the second brace bar has a longitudinal axis between the first end and the second end, and the longitudinal axis of the second brace bar is substantially parallel with the longitudinal axis of the first brace bar.

* * * * *